United States Patent
Kakimoto et al.

(10) Patent No.: US 6,553,414 B1
(45) Date of Patent: Apr. 22, 2003

(54) SYSTEM USED IN PLURAL INFORMATION PROCESSING DEVICES FOR COMMONLY USING PERIPHERAL DEVICE IN NETWORK

(75) Inventors: Atsushi Kakimoto, Yokohama (JP); Koji Kikuchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/410,299

(22) Filed: Sep. 30, 1999

(30) Foreign Application Priority Data

Oct. 2, 1998 (JP) .......................................... 10-281294
Oct. 6, 1998 (JP) .......................................... 10-284115

(51) Int. Cl.$^7$ .......................................... G06F 15/177
(52) U.S. Cl. ...................... 709/220; 709/201; 709/203; 709/220; 709/223; 710/8; 710/15
(58) Field of Search ................................ 709/203, 206, 709/208, 201, 223, 249, 217, 220; 710/5, 8, 15; 395/712, 828

(56) References Cited

U.S. PATENT DOCUMENTS

| | | | | |
|---|---|---|---|---|
| 5,832,298 A | * | 11/1998 | Sanchez et al. ................. 710/8 |
| 5,862,404 A | * | 1/1999 | Onaga ........................ 395/828 |
| 5,911,044 A | * | 6/1999 | Lo et al. ..................... 709/203 |
| 5,953,532 A | * | 9/1999 | Lochbaum ................... 395/712 |
| 6,003,065 A | * | 12/1999 | Yan et al. .................... 709/201 |
| 6,065,043 A | * | 5/2000 | Domenikos et al. ........ 709/203 |
| 6,067,582 A | * | 5/2000 | Smith et al. ................... 710/5 |
| 6,101,555 A | * | 8/2000 | Goshey et al. .............. 709/301 |
| 6,256,662 B1 | * | 7/2001 | Lo et al. ..................... 709/203 |
| 6,289,371 B1 | * | 9/2001 | Kumpf et al. ............... 709/203 |
| 6,324,578 B1 | * | 11/2001 | Cox et al. ................... 709/223 |
| 6,327,613 B1 | * | 12/2001 | Goshey et al. .............. 709/208 |

* cited by examiner

Primary Examiner—Ayaz Sheikh
Assistant Examiner—Thu Ha Nguyen
(74) Attorney, Agent, or Firm—Morgan & Finnegan LLP

(57) ABSTRACT

Environments of various devices such as an image input device are effectively used as a commonly used resource (shared resource) on a network can be simply set without any loss. In an information processing apparatus provided on a network, a CPU checks as to whether or not a device is locally connected to this information processing apparatus, and then notifies this check result to a management device provided on the network. This management device judges as to whether or not a server program of a common system is installed in a terminal apparatus based on a content of a notification issued from this terminal apparatus. In accordance with this judgement result, the management device installs this server program to this terminal apparatus. Furthermore, in an information processing apparatus having a client function with respect to the server program, when this server program is present on the same node on the network, the information processing apparatus is automatically controlled so as to directly communicate, whereas so as to communicate via a network when this server program is present on another node.

24 Claims, 17 Drawing Sheets

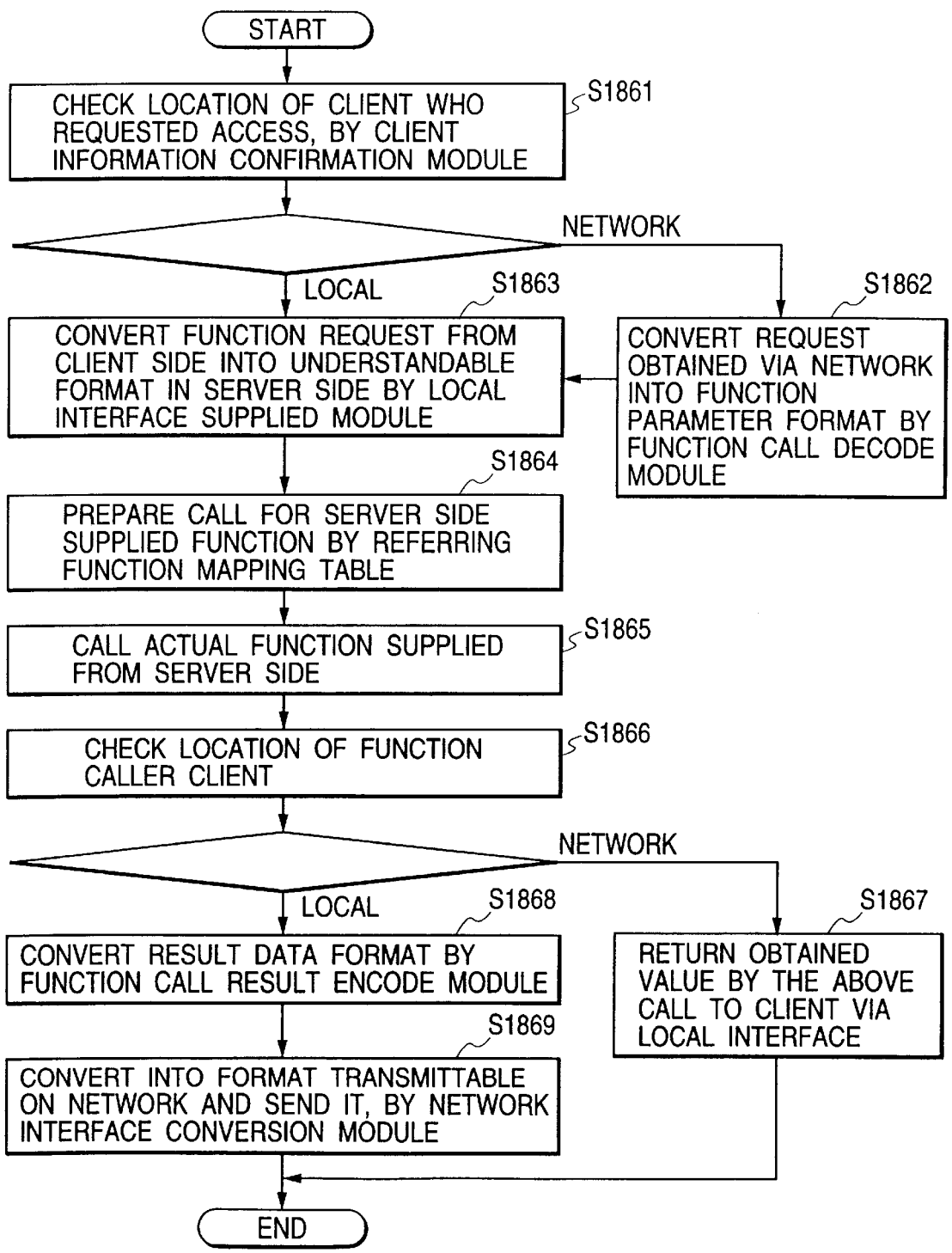

SYSTEM USED IN PLURAL INFORMATION PROCESSING DEVICES FOR COMMONLY USING PERIPHERAL DEVICE IN NETWORK

BACKGROUND OF THE INVENTION

1. Field of the Invention

The present invention relates to a network system in which a peripheral device such as an image reading device is commonly used by a plurality of information processing apparatuses provided on this network system.

2. Related Background Art

Conventionally, a large number of common systems are established. In these common systems, peripheral devices such as image reading devices are commonly used by a plurality of terminals provided on network systems.

In this case, either a manager of the network or a user of the image reading device must go to an actual place where the image reading device and other devices are physically located, and then must manually perform complex installation operations and also complex setting works.

Also, when the above-explained common system is constructed, the software of this common system is required to be installed into all of the devices provided on the network. Therefore, with respect to a certain device to which this software need not be originally installed, there was a case in that a waste of resource occurred.

Also, even when the common system can be constructed, since users on the network cannot simply become aware of the setting content of this common system, a certain number of users cannot use this setting content.

As previously explained, in the above-described conventional network system, in the respective devices connected to the network, even when there is such a device to which the image reading device is connected, there is no way to commonly use this image reading device unless the user actually goes to the place of this device connected with the image reading device and properly sets this device. As a consequence, there are some possibilities that the user cannot effectively utilize this device. Also, there is a problem that since the function of the common system is installed to all of the devices provided on the network, there was a case in that a waste of device resource occurred.

On the other hand, a user utilizes an image reading device provided on a network via a terminal apparatus in such a case that this image reading device is locally connected to own device, or is locally connected via the network to another device.

In such a case, it is desirable that this network user may utilize this image reading device without paying his attention to the connection mode of this image reading device.

SUMMARY OF THE INVENTION

The present invention has been made to solve the above-explained problems, and therefore, has an object to simply set the following environment without any loss. That is, since a common system is also automatically constructed with respect to such a device on a network, to which an image reading device is connected, a resource such as this image reading device can be effectively utilized.

Another object of the present invention is capable of optimally constituting the above-explained common system with employment of network management information, since the user on this network or the manager of the device constitutes a desirable common system of the image reading device.

Another object of the present invention is such that when a common system is constituted, this common system is effectively used by the user of the network.

A further object of the present invention is to realize such an environment. That is, even when an image reading device is directly connected to a network, or is locally connected to a terminal apparatus on this network, a user of this network can easily utilize this image reading device irrespective of a connection mode of this image reading device.

A still further object of the present invention is to realize such an environment. That is, a user of a network can readily utilize an image reading device without paying his attention to a connection mode of this image reading device.

BRIEF DESCRIPTION OF THE DRAWINGS

FIG. 17 is a flow chart for describing process operations executed when a function request is issued from each of the client modules to the server modules in the network server module 1424.

DESCRIPTION OF THE PREFERRED EMBODIMENTS

Referring now to drawings, an embodiment of the present invention will be described in detail.

First Embodiment

Description of Device

Figure 1:
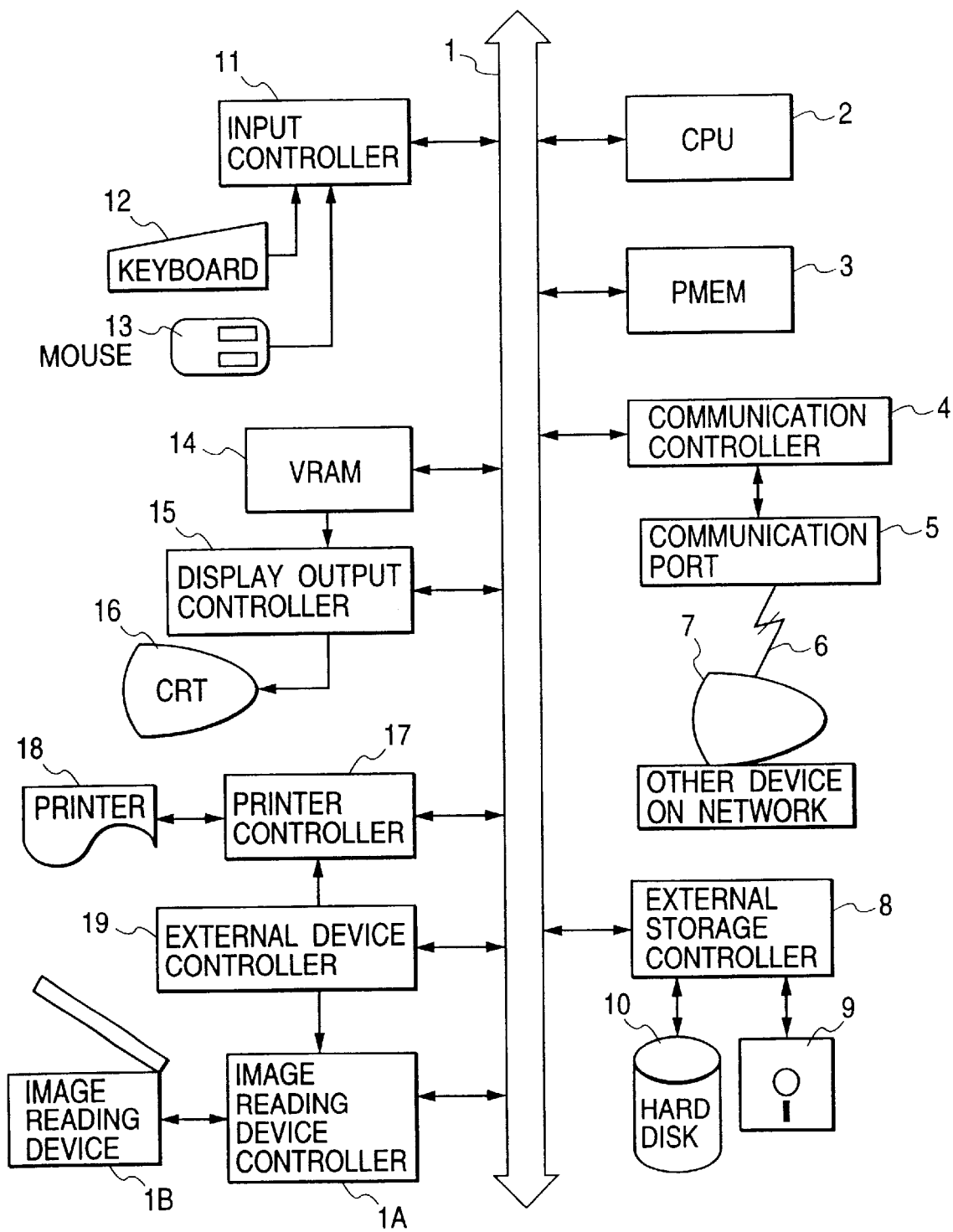
FIG. 1 schematically shows an arrangement of a terminal apparatus provided in a network according to a first embodiment of the present invention.

FIG. 1 is a schematic block diagram for indicating an arrangement of a terminal apparatus to which an image reading device is locally connected in a network system according to a first preferred embodiment of the present invention.

In this drawing, reference numeral 1 shows a system bus. Structural blocks (will be discussed later) are connected to this system bus 1. Reference numeral 2 indicates a CPU (Central Processing Unit).

Reference numeral 3 denotes a program memory (will be simply referred to as a "PMEM" hereinafter). A program required to execute this process operation is properly selected/read out from a hard disk (unit) 10, and is once stored into this program memory 3 so as to be executed under control of the CPU 2. Also, data entered via a keyboard 12 is stored as code information into the PMEM 3 which may also function as a text memory. Also, reference numeral 4 shows a communication controller, and this communication controller 4 controls input/output data in a communication port 5. A signal outputted from the communication port 5 is transmitted via a communication line 6 to another communication port of another device provided on the network.

Image data are transmitted/received via the above-explained communication controller 4 between an image output device such as a printer, and an image reading device such as a scanner, which are commonly used, or shared on the network.

It should be noted that in this first embodiment, the network such as LAN is described as the above-explained communication line 6. Apparently, the network system of the present invention may be applied to even such a case that both the communication port and the communication line, connected to this communication controller 4, are the general-purpose public line..

Also, reference numeral 8 shows an external storage controller, and reference numerals 9 and 10 represent data filing disks. For instance, reference numeral 9 shows a floppy disk (will be referred to as an "FD" hereinafter), and reference numeral 10 indicates a hard disk (will be referred to as an "HD" hereinafter).

Further, reference numeral 11 shows an input controller. An input device such as a keyboard 12 and a mouse 13 is connected to this input controller 11.

An operator manipulates this keyboard 11 so as to instruct operations of the network system.

Also, reference numeral 13 represents a pointing device (will be referred to as a "PD" hereinafter) used to instruct processing of image information on a CRT 16. In this first embodiment, the mouse is used as this pointing device. As a result, the operator may arbitrarily move the cursor displayed on the CRT 16 along an X direction and a Y direction and may select a command icon displayed on a command menu so as to instruct a process operation. Furthermore, the operator may instruct an editing object, and a drawing position.

Reference numeral 14 shows a video image memory (will be referred to as a "VRAM" herein after), reference numeral 15 indicates a display output controller, and reference numeral 16 represents a CRT (cathode-ray tube). The data displayed on the CRT 16 is expanded as bit map data on the VRAM 14.

Reference numeral 17 shows a printer controller. When a printer 18 is connected to the printer controller 17, this printer collar 17 controls this printer 18 to output data.

Reference character 1A denotes an image input device controller for controlling an image input device 1B connected thereto.

Furthermore, the arrangement of the network system shown in FIG. 1 may have similar functions even in such a case that an image input device and an image input device controller will constitute physically separate components from each other, and furthermore, an image input device will constitute such a single component containing an image input device controller. (Structural Example to realize First Network System on Network)

Figure 2:
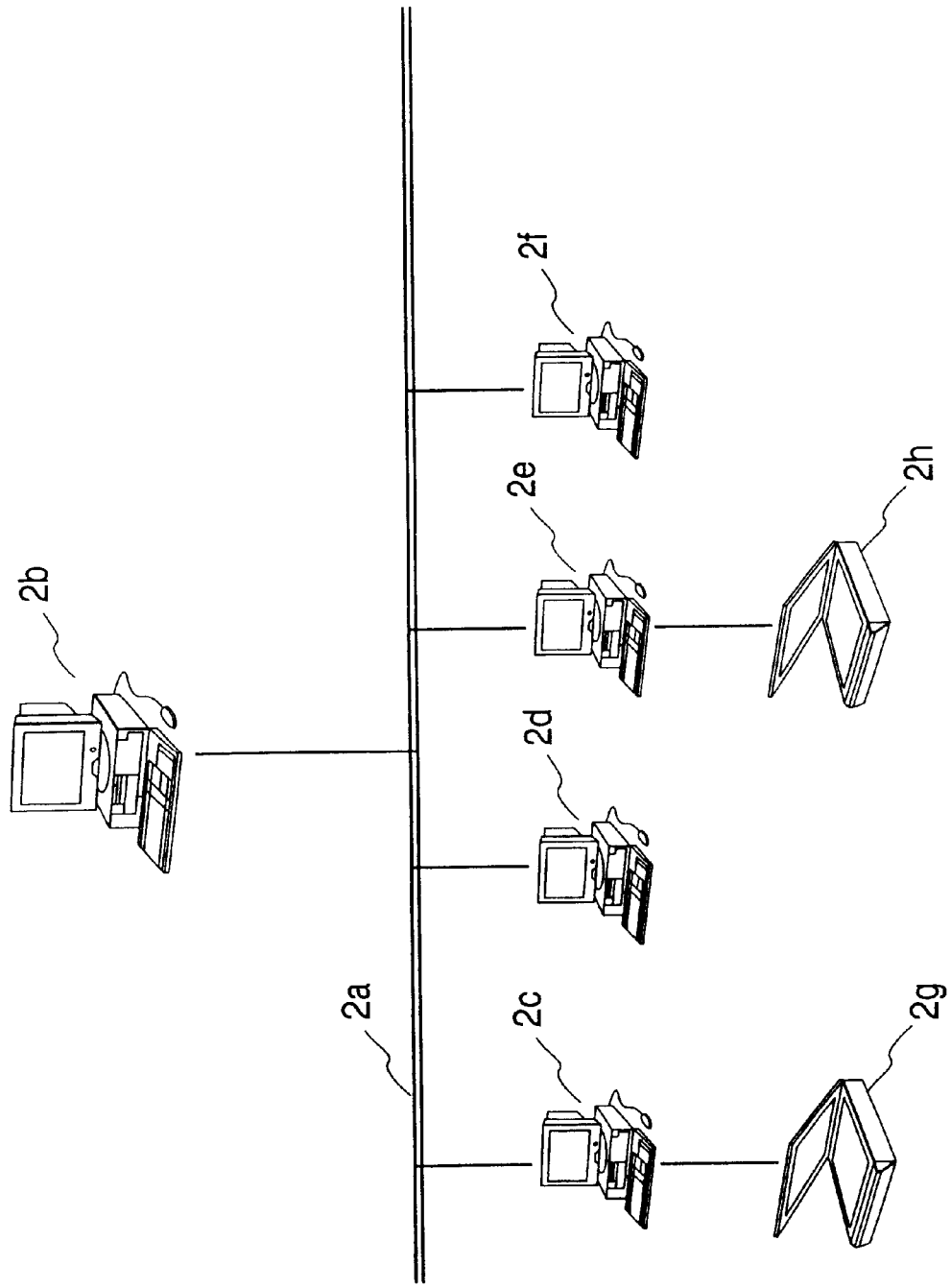
FIG. 2 schematically indicates a structure of the network according to the first embodiment of the present invention.

Referring now to FIG. 2, a description will be made of a network structure according to this first embodiment. In FIG. 2, reference character 2a shows a network, and reference character 2b indicates a machine management device for constructing/setting a common (shared) system of an image reading device. Also, reference characters 2c, 2d, 2e, and 2f represent terminal apparatus connected to the network 2a. Reference characters 2g, 2h indicate image reading devices. The image reading devices 2g and 2h are connected to the terminal apparatus 2c and 2e, respectively.

The terminal apparatus 2c and 2e connected to the above-explained network 2a are equipped with a server function by which the image reading devices 2g and 2h locally connected to the network are commonly used on the network 2a. It should be noted that this server function is installed from the machine management device 2b (will be explained later). Also, each of the terminal apparatus 2c to 2f connected to the above network 2a is equipped with a client function by which image data is acquired by using a general-purpose network protocol from the image reading devices 2g and 2h which are commonly used by employing the above-explained server function. As explained above, such a system for commonly using the image reading devices on the network will be simply referred to as a "common system".

Figure 3:
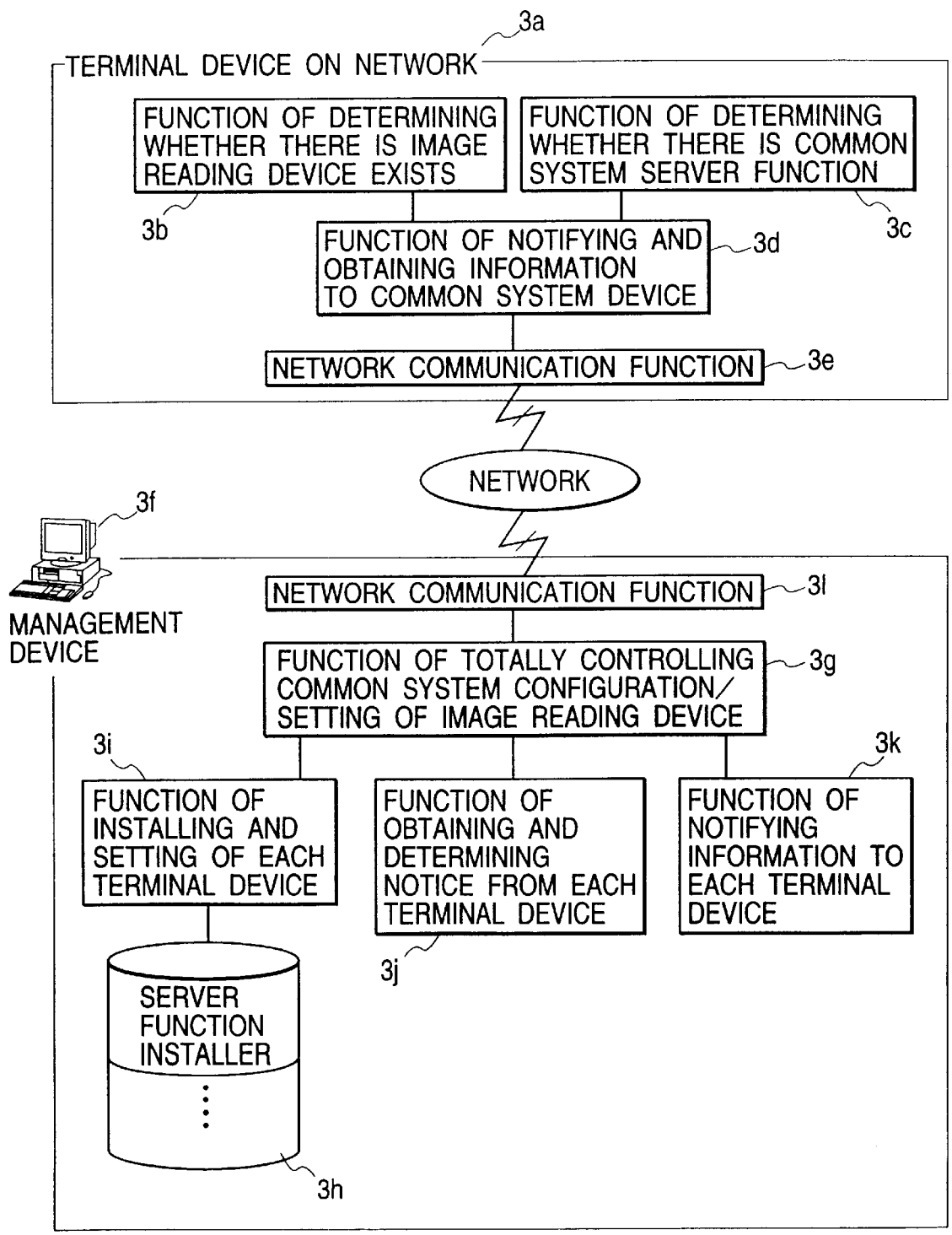
FIG. 3 schematically represents internal function structures of the respective machines according to the first embodiment.

Function Structures Realized in Terminal Devices on Network, and Function Structures Realized in Management Device of Common System in First Network System FIG. 3 schematically indicates internal arrangements of the respective terminal apparatus 2c to 2f connected to the network 2a, and also internal arrangements of the management device 2b of the common system in the above-explained structural example shown in FIG. 2.

In FIG. 3, reference character 3a shows one of the terminal apparatus indicated as "2c" to "2f" in FIG. 2 on the network. This terminal apparatus 3a is equipped with a determining function 3b, another determining function 3c, a function 3d to notify a determined content to the management device and also to acquire information from the management device 3f, and a function 3e for performing a communication/control operation to the network. Concretely speaking, the determining function 3b determines as to whether or not an image reading device locally connected to the network is present. The determining function 3c determines as to whether or not the server function of the common system of the image reading device has been set. The remaining function 3d controls these functions 3b and 3c to notify these determined results to the management device 3f of the common system, and further acquires the information from the management device 3f.

Next, reference character 3f indicates a management device of the common system of the image reading device indicated as "2b" in FIG. 2. This management device 3f is equipped with the below-mentioned respective functions 3g to 3i. That is, reference character 3g shows a function for controlling all functions as a main process operation of managing/setting the common system. Reference character 3h represents a function for saving an installer such as the server function with respect to each of the terminal apparatus 3a. It is conceivable that as a means for saving this installer, since a hard disk device (HDD) and other storage media may be employed, no specific component is limited in this first embodiment. Also, the place used to save this installer may be located outside this machine, if accessible to this installer.

Also, reference character 3i represents a function used to automatically install and also set the installer saved in the above-explained saving means (function) 3h into the terminal apparatus 3a connected to the network. It should also be noted that there is no limitation in the installing method, and therefore, the well-known installing method may be employed. Furthermore, reference character 3j denotes a function for acquiring the information notified by the information notification/acquisition function 3d realized in each of the terminal apparatus 3a connected to the network, and further for determining as to whether or not the server function is required to be installed into each of the terminal apparatus 3a.

Further, reference character 3k shows a notification function. That is, in the case that since the installing process operation of the above-explained server function is carried out, an environment on the network is changed (for example, a total number of commonly-used image reading devices is increased), this changed content is notified to each of the terminal apparatus 3a provided on the network. Reference character 3i shows a function for communicating/controlling the network, similar to the above-explained function 3e realized in the terminal apparatus 3a.

Processing Sequence

Figure 4:
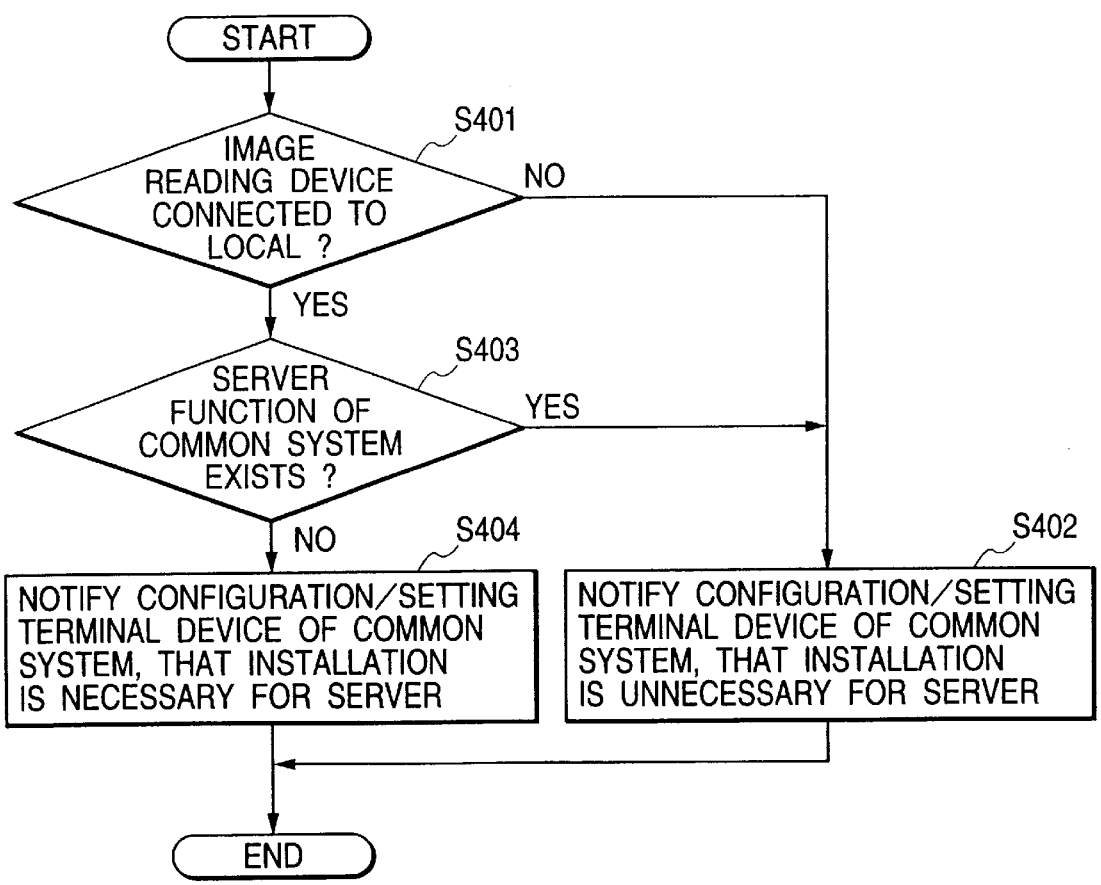
FIG. 4 is a flow chart for describing contents of process operations executed in a terminal apparatus 3a according to the first embodiment.

FIG. 4 is a flow chart for describing an internal processing operation executed in the terminal apparatus 3a connected to the network shown in FIG. 3, according to this first embodiment. It should understood that this internal processing operation may be regularly initiated, or may be initiated in response to a request issued from the management device 3f of the common system, but the present invention is not limited thereto.

When this process operation is initiated, the CPU 2 checks as to whether or not an image reading device is locally connected in each of the terminal apparatus 3a at a step S401. When the image reading device is not locally connected to the terminal apparatus, since the server function of the common system in this terminal apparatus 3a is not required, the CPU 2 notifies such a fact that the server function need not be installed with respect to the management device 3f of the common system at a step S402.

On the other hand, when the image reading device is locally connected to a certain terminal apparatus 3a, the CPU 2 checks as to whether or not the server function of the common system has been already installed and also set to this terminal apparatus 3a at a step S403. In the case that the server function of the common system has been already installed and set, since this server function need not be again installed, this CPU notifies "install not required" to the management device 3f at a step S402. On the other hand, in the case that there is no server function of the common system, the CPU 2 notifies such a fact that the server function need be installed and set to the management device 3f of the common system at a step S404.

When a series of the above-explained process operations are carried out, this internal process operation of the terminal apparatus is completed. It should also be noted that the method for notifying the messages defined at the above steps S402 and S404 may be realized by using the general-purpose network protocol, but is not limited to the above-explained message notification method.

Figure 5:
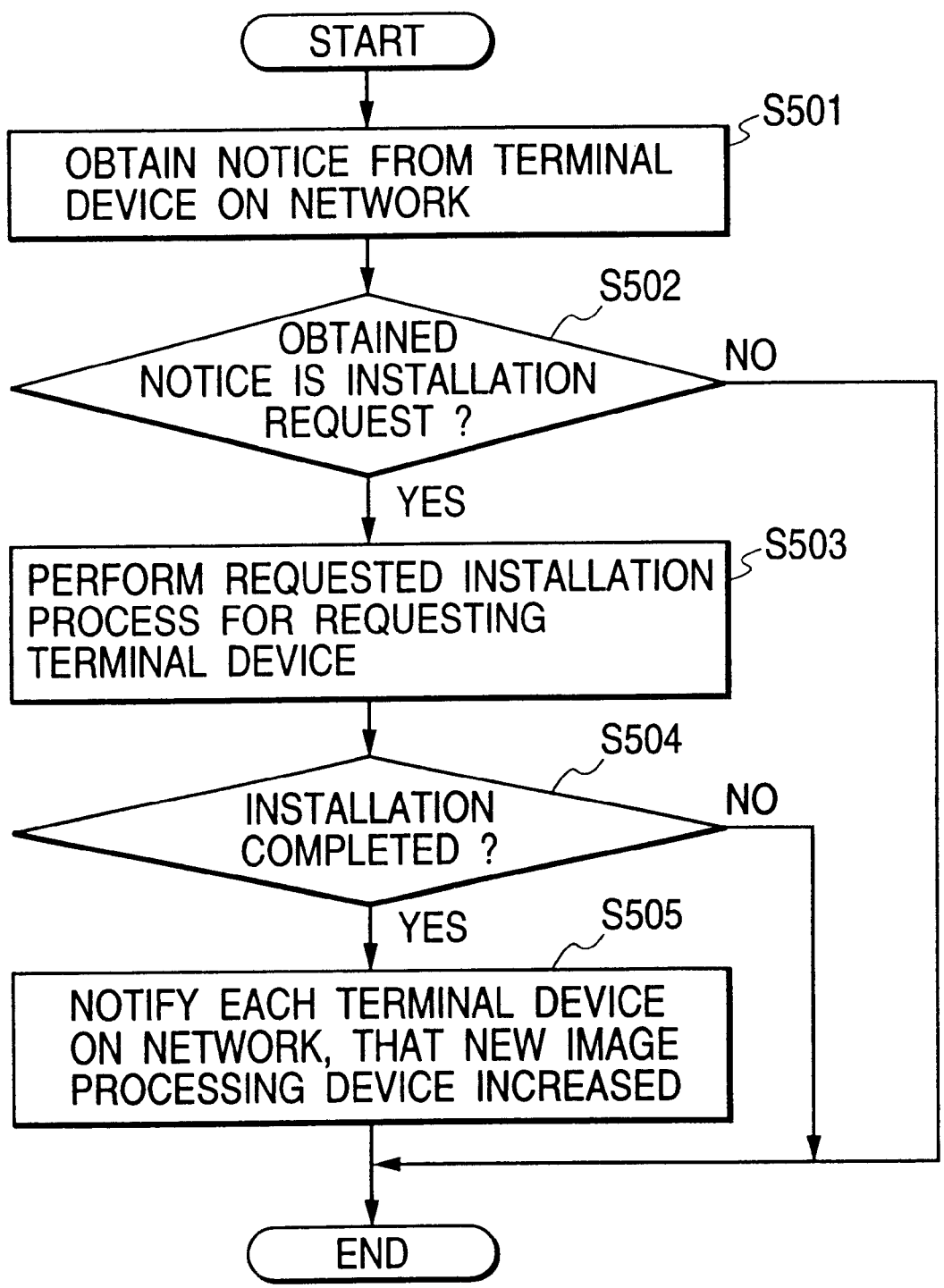
FIG. 5 is a flow chart for describing contents of process operations executed in a management device according to the first embodiment.

Also, FIG. 5 is a flow chart for describing an internal processing operation of the management device 3f provided on the network shown in FIG. 3, according to this first embodiment.

First, the CPU 2 acquires the requirement/not requirement notification about installation of the server function, which is transmitted by the information notifying/acquiring function 3d provided in each of the terminal apparatus 3a on the network by the notification acquisition function 3j shown in FIG. 3. Also, it should be understood that the process operation for sending/receiving the notification may be carried out by way of the method for requesting the information notifying/acquiring function 3d provided in each of the terminal apparatus 3a by the management device 3f, or the method in which each of the terminal apparatus 3a notifies the information by using the information notifying/acquiring function, but the present invention is not limited to these methods.

At a first step S501 of the flow chart shown in FIG. 5, when the notification acquiring/judging function 3j of FIG. 3 acquires the notification sent from the terminal apparatus 3a, the CPU 2 judges as to whether or not the server function is installed and set based open the content of this notification at a step S502. When the server function is not required to be installed and set, the process operation for such a terminal apparatus 3a which has acquired this notification is accomplished. On the other hand, when this server function is required to be installed and set, the CPU 2 informs this information to the total management function 3g of FIG. 3. At a step S503, the install/setting function 3i of FIG. 3 is called by the total management function 3g in response to this information, so that the process operation for installing/setting the server function is carried out.

Then, at a step S504, the CPU 2 judges as to whether or not installing/setting of the server function can be successfully carried out. When this installing/setting operation is successfully performed, the CPU 2 notifies such a fact that the image reading device is newly and commonly used to the terminal apparatus 3a provided on the network by employing the information communication function 3k of FIG. 3.

This notification may be set to another terminal apparatus by using the electronic mail transmission function by the terminal apparatus 3a. It should also be noted that at the step S505, the management device 3f may notify the information to another terminal apparatus instead of the terminal apparatus 3a.

While the above-explained process operations are accomplished, the server function can be automatically installed and set in the common system of the image reading device. As a consequence, as to the construction of such a system capable of commonly using the image reading device on the network, the common system can be automatically constructed/set while omitting the difficult installing process operation for the user and no specific workload is given to the user. Therefore, the network system can be utilized under better conditions.

Also, the server function of the common system is installed and set only to the terminal apparatus 3a to which the image reading device is connected, whereas no server function is installed/set to such a terminal apparatus 3a to which the image reading device is not connected. As a result, the server function can be installed only to a minimum number of terminal apparatus 3a which require this server function, and a waste of resource in such a machine which originally never requires the server function can be avoided.

Furthermore, since the image reading device in which the server function has been installed/set is commonly used on the network, and also the means for notifying this process content to the respective terminal apparatus are provided, the user existed on the network can simply grasp the content of the common setting process, and therefore, a large number of users can effectively utilize the common-set system.

Second Embodiment

In the above-explained first embodiment, the installation process operation of the server function is described under such an initial condition that the respective functions indicated by reference characters 3b to 3d of FIG. 3 have initially been installed with respect to the terminal 3a provided on the network. In contrast, in this second embodiment, the above-explained functions 3b to 3d are also automatically installed. As a result, while the user need not completely pay his attention to the installation process operation, the installation process operation can be realized by minimizing a waste of resource.

Figure 6:
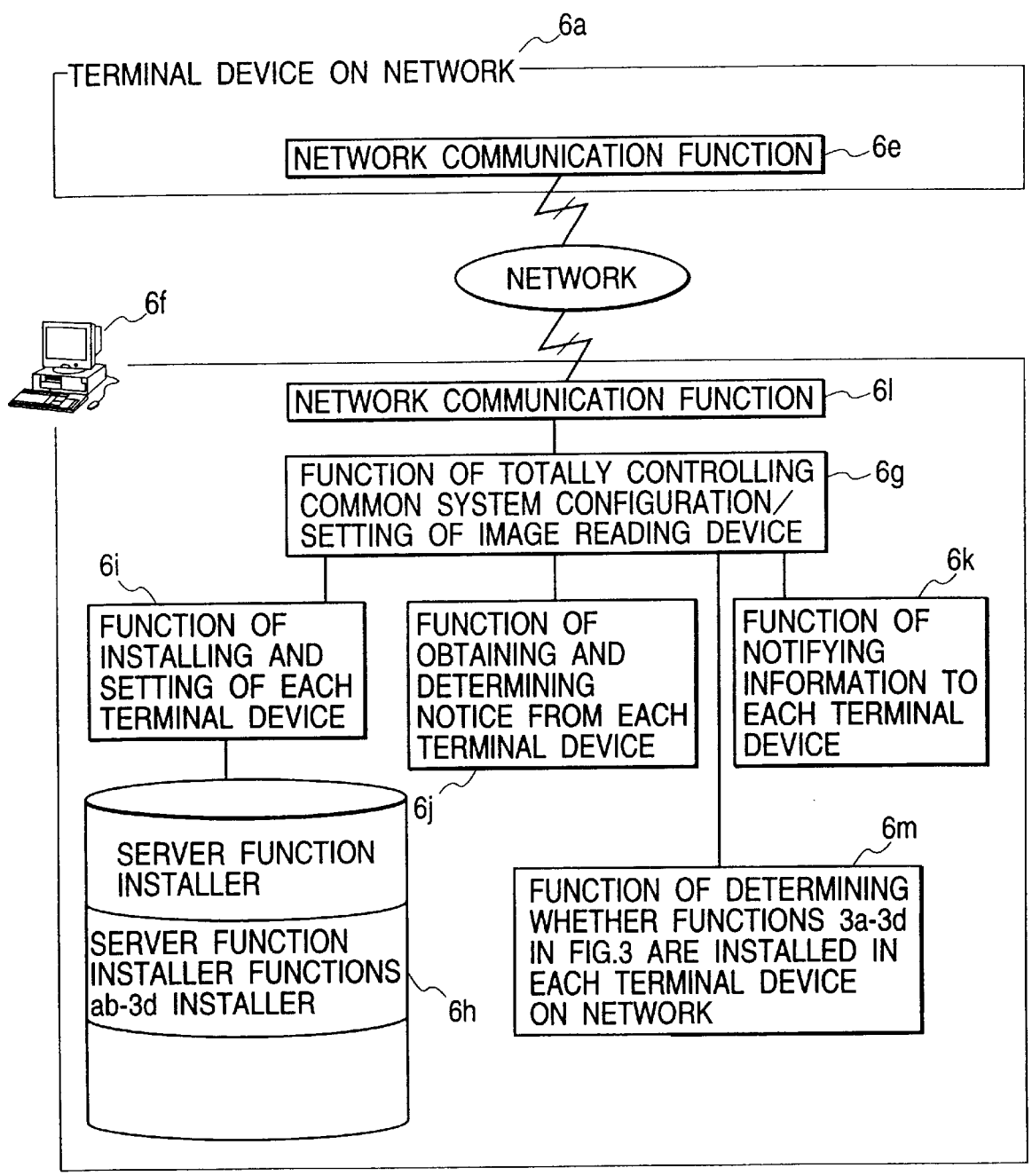
FIG. 6 schematically represents internal function structures provided in the respective devices according to a second embodiment of the present invention.

First, in FIG. 6, reference character 6a (corresponding to 3a of FIG. 3) indicates a terminal apparatus provided on a network. This terminal apparatus 6a is equipped only with a network communication function 6e (corresponding to 3e of FIG. 3). In this embodiment, the respective functions 3b to 3d provided in the terminal apparatus 3a shown in FIG. 3 are saved in a saving means 6h corresponding to saving means 3h of FIG. 3) employed in the management device 6f of FIG. 6 in such a format installable in each of the terminal apparatus 6a provided on the network.

Then, the management device 6f is further provided with a function 6m for determining as to whether or not the above-explained functions 3b to 3d are already installed in the terminal apparatus 6a. When these functions are not installed, the respective functions 3b to 3d are installed by an installing/setting function 6i (corresponding to installing/setting function 3i of FIG. 3). Other functions are substantially identical to those of FIG. 3. That is, the respective remaining functions 6f, 6g, 6j, 6k, and 6l correspond to 3f, 3g, 3j, 3k, and 3l respectively.

In a flow chart of this second embodiment, an automatic installation process of the respective functions 3b to 3d is additionally provided at a first step of the flow chart shown in FIG. 4 as to the process operations of the terminal apparatus 6a provided on each of the networks. In this installation process, the functions 3b to 3d are automatically installed from the management device 6f that constitutes a common system of an image reading device. Since process operations subsequent to this automatic installation process operation are carried out in a similar manner to those of FIG. 4, detailed explanations thereof are omitted.

Figure 7:
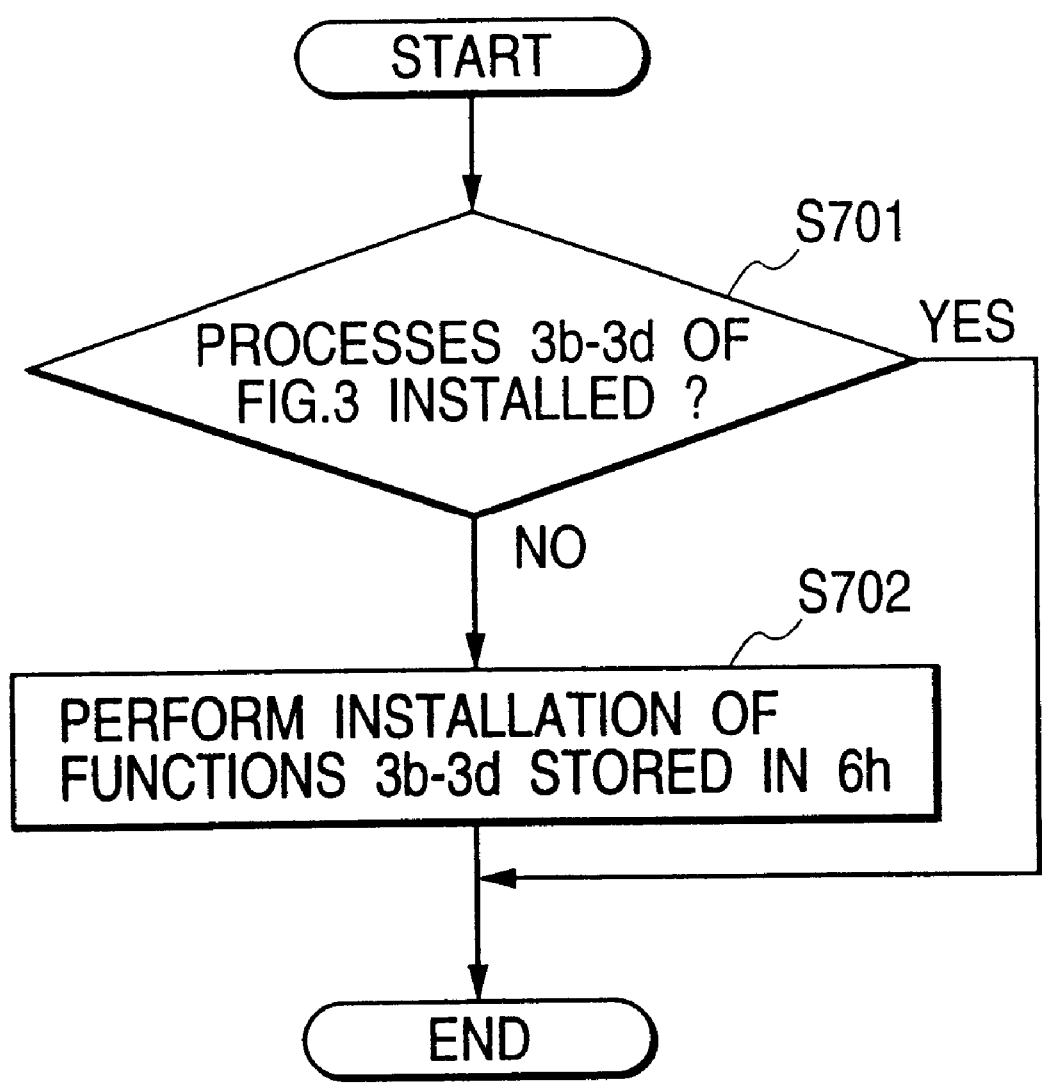
FIG. 7 is a flow chart for describing contents of process operations executed in a management device according to the second embodiment.

Also, as to the process operation of the management device 6f of the common system, as shown in FIG. 7, a process operation for installing the respective functions 3b to 3d of FIG. 3 to the terminal apparatus 6a in addition to the flow chart of FIG. 5. In FIG. 7, at a first step S701, the determining function 6m determines as to whether or not the functions 3b to 3d of FIG. 3 are already installed in the terminal apparatus 6a.

Now, when the respective functions are already installed, this process operation is completed. When, the respective functions are not installed, at a step S702, the installing/setting function 6i executes the installation by employing an installer of the above-explained functions 3b to 3d saved in the saving means 6h. As apparent from this flow chart, since the same structure as that of the fist embodiment is constructed, descriptions of the subsequent process operations (flow chart of FIG. 5) will be omitted.

Third Embodiment

Figure 8:
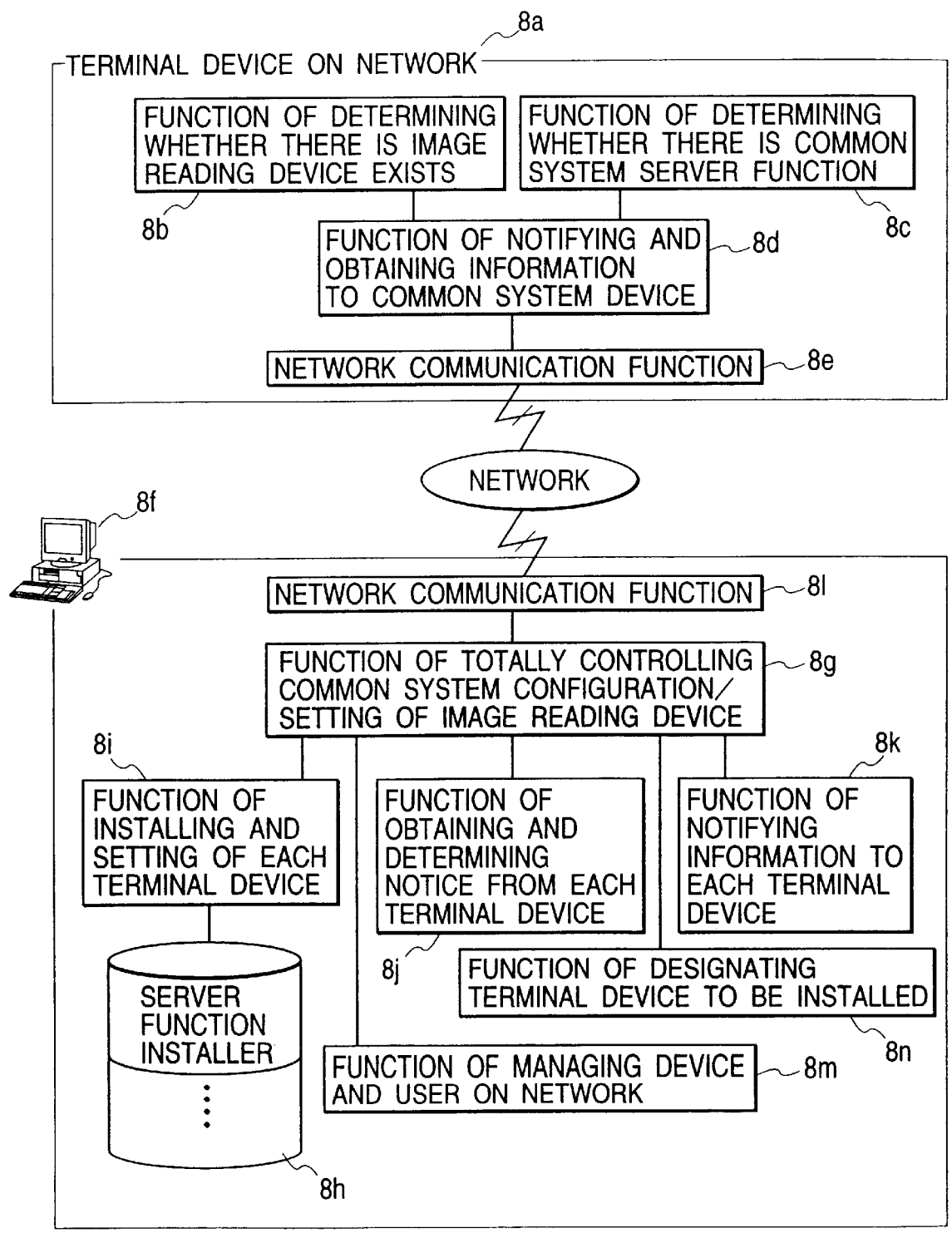
FIG. 8 schematically represents internal function structures provided in the respective devices according to a third embodiment of the present invention.

In a third embodiment, since a network manager designates such a terminal apparatus to which a server function can be installed, a common system of a desirable image reading device is automatically constructed while a user need not pay his attention to this installation. FIG. 8 is a schematic diagram indicating internal arrangements of a terminal apparatus and a management device according to this third embodiment.

In FIG. 8, the respective functions 8a to 8l correspond to the respective functions 3a to 3l, and therefore, descriptions thereof are omitted. Reference character 8m shows a function capable of acquiring/managing machine information and user information from a network. Reference character 8n represents a function capable of designating a machine to which a server function is installed by a manager, or a desirable user.

Since these functions 8m and 8n are additionally employed, the network manager can set such a machine allowed to install the server function into the own machine by employing the designating function 8n in connection with the machine information and the user information, which are managed by the managing function 8m. As a result, it is possible to automatically construct the common system of the desirable image reading device on the network by the manager.

As to a flow chart of this third embodiment, since the process operations executed in the terminal apparatus 8a provided on the network man be realized by the same process operations of the first embodiment in FIG. 4, descriptions thereof will be omitted.

On the other hand, process operations executed in the management device 8f of the common system of the image reading device will now be explained with employment of a flow chart of FIG. 9.

It is now assumed that the manager of the management device 8f of the common system of the image reading device previously sets a machine allowed to install the server function into the own machine by employing the functions 8m and 8n shown in FIG. 8, and this machine information is previously saved.

Figure 9:
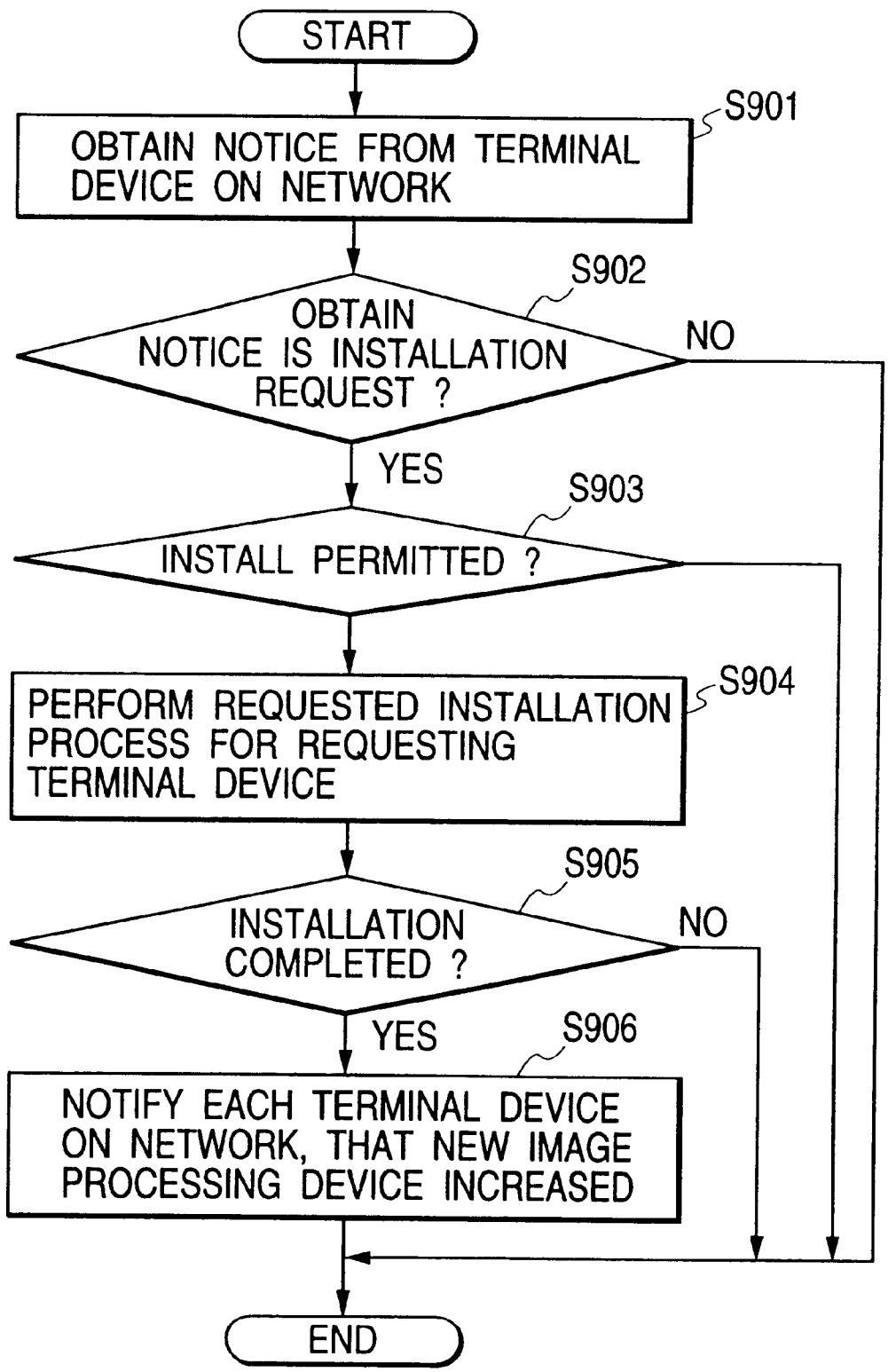
FIG. 9 is a flow chart for describing contents of process operations executed in a management device according to the third embodiment.

At a first step S901 of FIG. 9, a notification acquiring/determining function 8j acquires a notification issued from each of terminal apparatus 8a provided on the network. At a next step S902, this notification determines as to whether or not the content of this acquired notification corresponds to a request for installing a sever function. When this notification content is not the installation request, this process operation of the management device 8j is ended. On the other hand, when the notification content is the installation request, the notification acquiring/determining function 8j determines as to whether or not the terminal apparatus 8a for issuing the installation request corresponds to such a machine. That is, this machine is managed by the managing function 8m, and is allowed to be installed by the manager.

In the case that this machine is not allowed to be installed, the process operation is ended. To the contrary, when this machine is allowed to install the server function into the own machine, the installation process of the server function is performed with respect to this requesting machine at a step S904. At the next step S905, the notification acquiring/determining function 8j determines as to whether or not the server function installation is completed. When this installation operation is not yet completed, the process operation is accomplished. To the contrary, when the installation operation is completed, the managing function 8m notifies that the server of the common system of the image reading device is newly increased in each of the terminal apparatus 8a on the network, and also notifies the content thereof at a step S906.

With execution of the above-described process operation, the common system of the image reading device can be automatically constructed/set, which is desired by the network manager.

Fourth Embodiment

The above-explained first to third embodiments have described such process operations that the server function is automatically installed without giving heavy loads to any users. However, this server function installation process does not consider a user who uses a machine to which the server function is automatically installed from a management device of a common system of an image reading device provided on a network.

Accordingly, in accordance with this fourth embodiment, when the server function is automatically installed, a confirmation notification is sent to the user who uses the server-function-installing machine, so that it is possible to determine as to whether or not this user installs the server function to the own machine.

Figure 10:
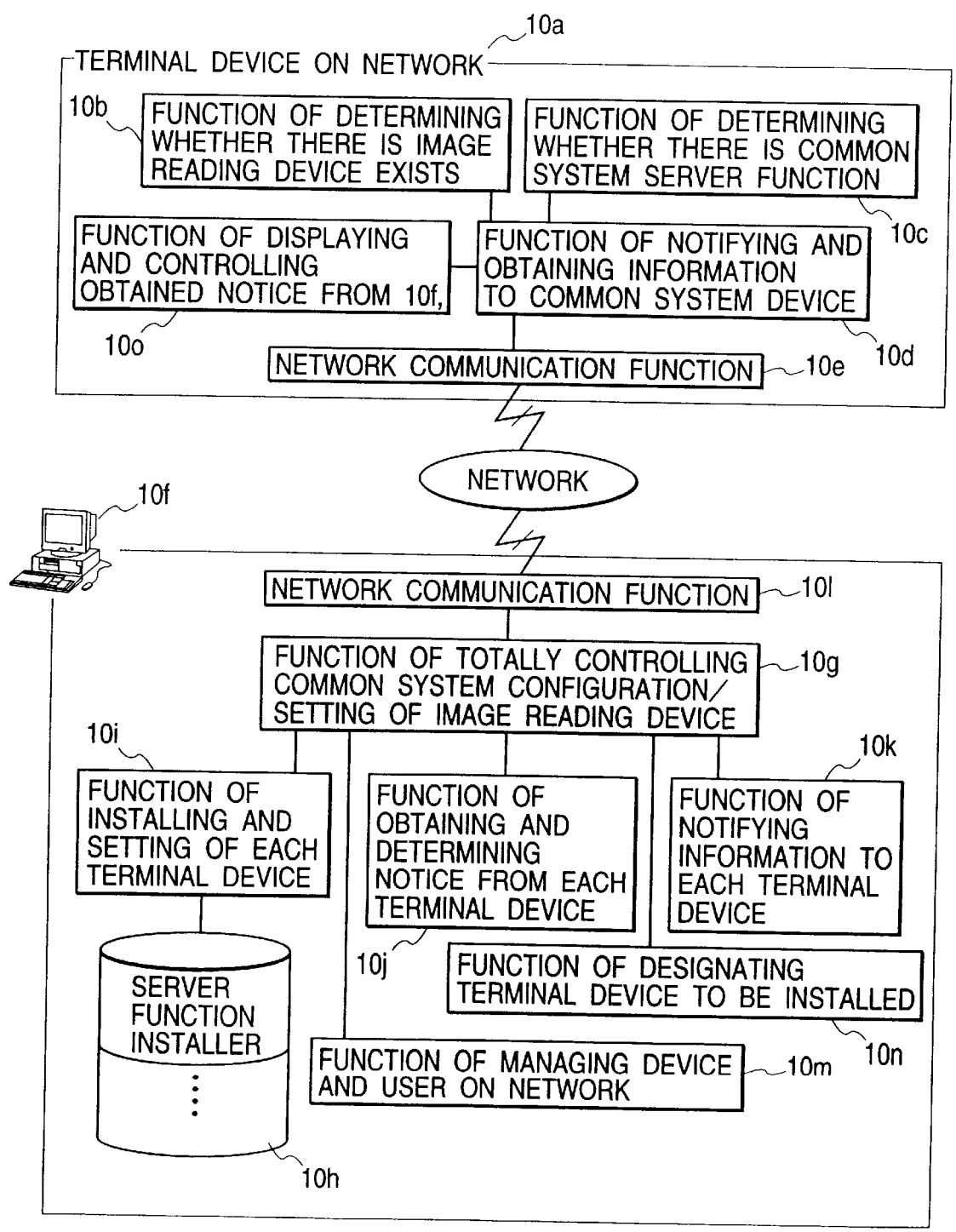
FIG. 10 schematically represents internal function structures provided in the respective devices according to a fourth embodiment of the present invention.

As a result, a security aspect can be established, and the automatic installation process can be executed under such highly established management system, which will be explained as follows:

FIG. 10 is a diagram for showing internal arrangements of the respective machines according to this fourth embodiment. In FIG. 10, since the respective functions of 10a to 10n correspond to the above-explained respective functions 8a to 8n shown in FIG. 8, descriptions thereof are omitted.

Reference character 10o indicates a function. That is, in such a case that an installation process operation is carried out from the management device 10f of the common system with respect to the terminal apparatus 10a, when an instal-executing message is notified by an information notifying function 10k to this function 10o, the function 10o displays the content of this notification on the terminal apparatus 10a, and then prompts a user to input as to whether or not an installation is allowed. When the user allows this installation, the installation process of the server function is carried out by the management device 10f. To the contrary, when the user does not allow this installation operation, this function 10o sends a rejection notification to the total managing function 10g provided in the management device 10f, and cancels the installation process operation.

Figure 11:
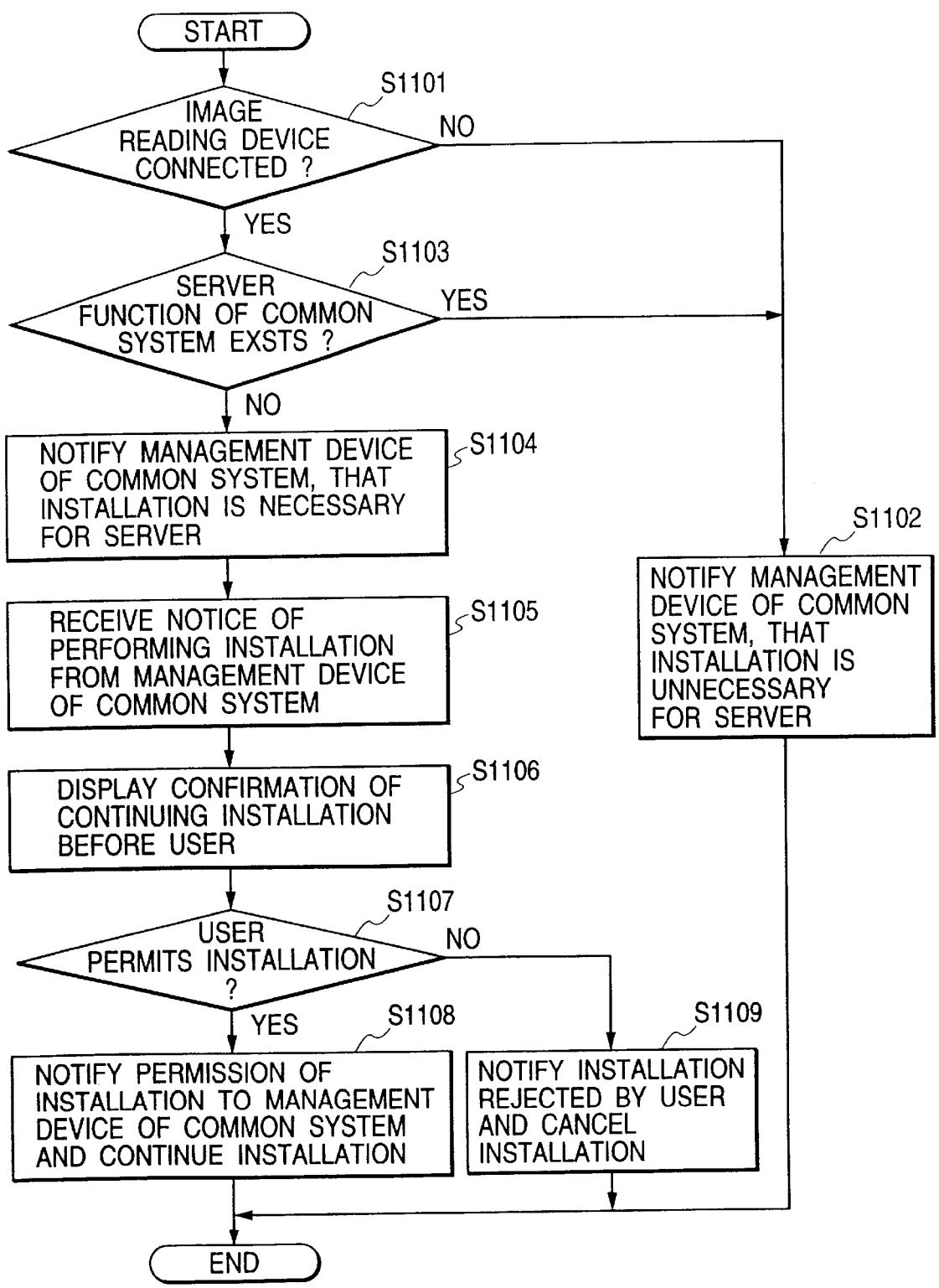
FIG. 11 is a flow chart for describing contents of process operations executed in a terminal apparatus 3a according to a fourth embodiment.

As to the process operations of this fourth embodiment, there is shown a flow chart for explaining process operations executed in each of the terminal apparatus 10a on the network in FIG. 11. Since the process operations defined from a step S1101 to a step S1104 in FIG. 11 are similar to those defined from the step S401 to the step S404 in FIG. 4, descriptions thereof are omitted.

When the notification issued at the above step S1104 is received by the management device 10f of the common system of the image reading device, the management device 10f notifies such a message that the install process is carried out with respect to this terminal apparatus 10a. At a step S1105, the function 10o provided in this terminal apparatus 10a acquires this notification. Then, at a step S1106, this function 10o displays on the screen, such a message that the management device 10f of the common system will execute the installation process operation, and prompts the user to allow the installation process operation.

Next, when the function 10o receives the user decision and allows the installation process operation at a step S1107, this function 10o notifies that the server program is allowed to be installed with respect to the management device 10f at a step S1108, so that the installation process operation is carried out. On the other hand, when the installation process operation of the server program is not allowed, this function 10o notifies a cancel of this installation process operation to the management device 10f at a step S1109.

Figure 12:
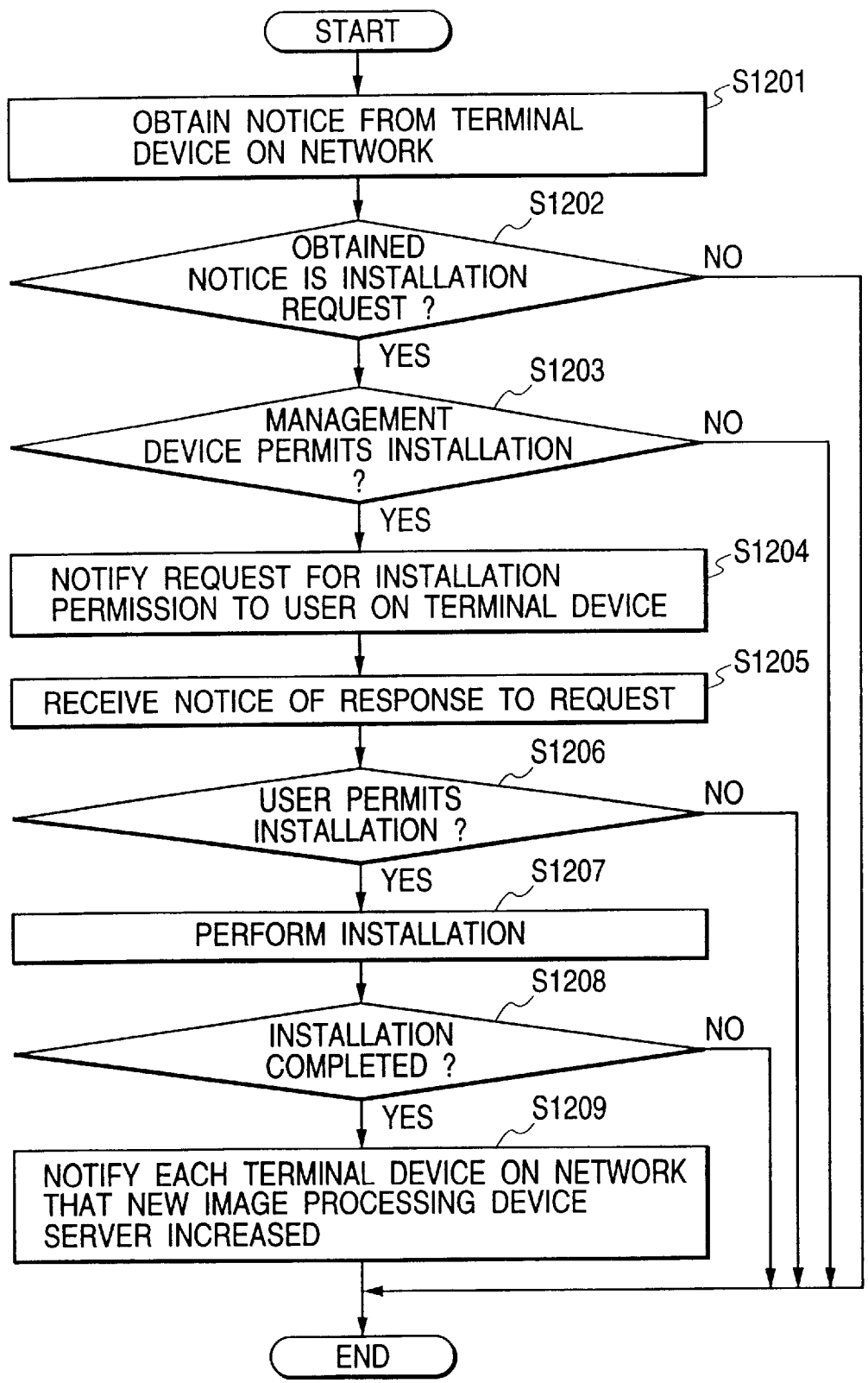
FIG. 12 is a flow chart for describing contents of process operations executed in a management device according to the fourth embodiment.

Then, FIG. 12 is a flow chart for describing process operations executed by the management device 10f of the common system. In FIG. 12, the management device 10f acquires a notification issued from each of the terminal apparatus 10a at a first step S1201. Next, at a step S1202, the management device 10f determines as to whether or not the content of the acquired notification corresponds to the installation request of the server function. When this notification does not correspond to the installation request, the process operation is accomplished. On the other hand, when the notification corresponds to the installation request, the management device 10f determines as to whether or not the install permission to this terminal apparatus 10a is made by the common system manager at a step S1203.

In this case, when the installation process operation of the server function is rejected by the common system manager, this process operation is ended. To the contrary, when this server function installation is allowed by the manager, the management device 10f notifies such a message that the installation process operation is executed to the user of the terminal apparatus 10a, who issues the installation request, and then prompts this user to enter the permission of this installation process at a step S1204. Then, at a step S1205, the management device 10f acquires the result of interrogated permission input at the previous step S1204 to judge the content of this acquired permission input. In other words, at the next step S1206, the management device 10f determines as to whether or not the user allows to install the server function into this terminal apparatus 10a.

At this time, when the user of this terminal apparatus 10a rejects the installation process operation of the server function, the process operation is ended. On the other hand, when the user allows to install the server function into this terminal apparatus 10a, the management device 10f executes the installation process operation at the next step S1207. Then, the management device 10f determines as to whether or not the installation process operation is accomplished without any problem at a step S1208. When this installation process operation is accomplished, management device 10f notifies to the respective terminal apparatus 10a provided on the network, such a fact that the image reading device is newly and commonly used-on the network, and also the content of this notification at a step S1209. Thereafter, this process operation executed by the management device 10f is completed.

Fifth Embodiment

A fifth embodiment of the present invention is directed to an image input system. That is, a user of a terminal apparatus can freely utilize an image reading device without paying any specific attention to the connecting mode of this image reading device even in such a case that this image reading device is locally connected to the own terminal, or is connected via a network to the own terminal.

Figure 13:
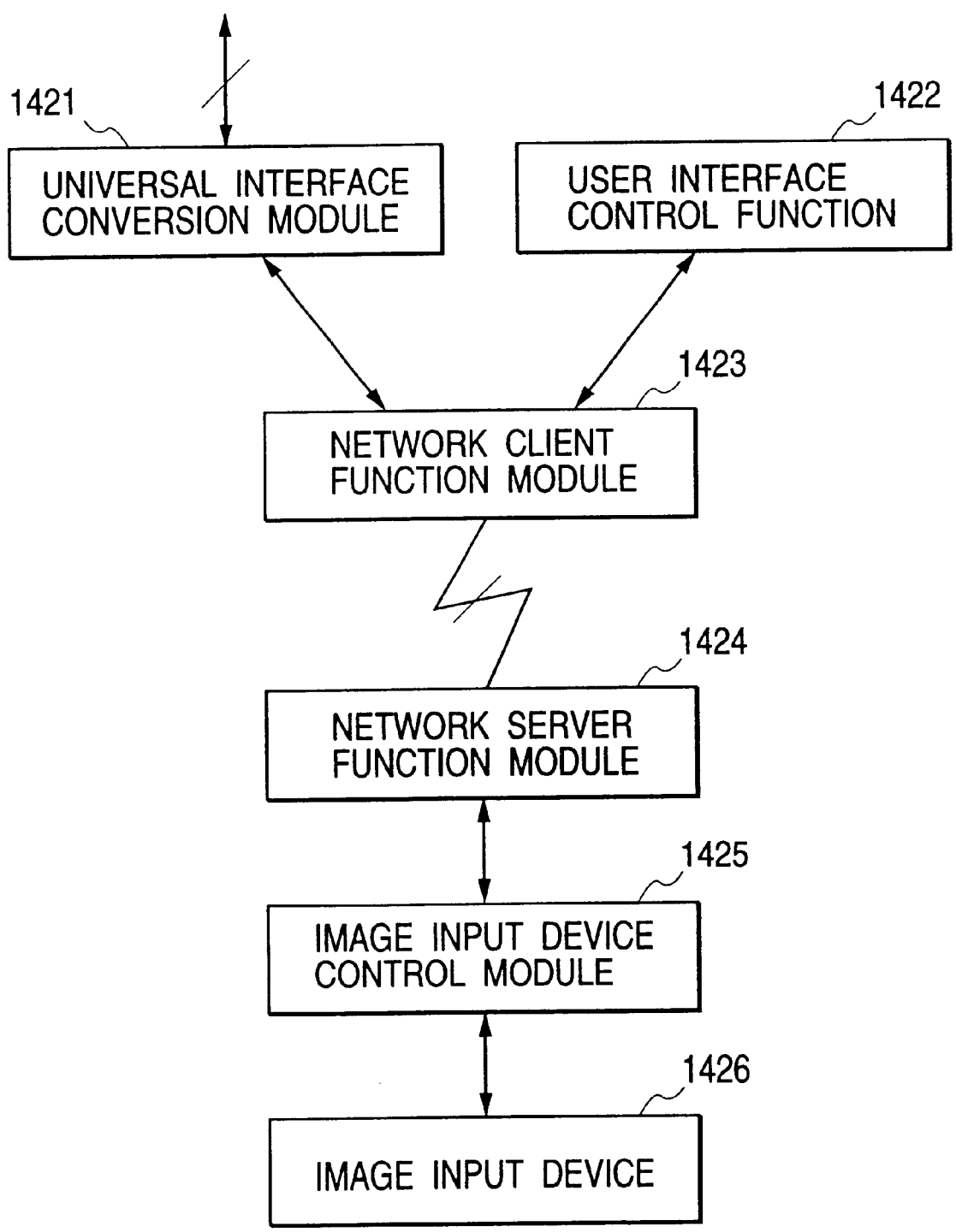
FIG. 13 is a diagram for indicating structural examples of the respective functions employed in an image input system according to a fifth embodiment of the present invention.

FIG. 13 schematically shows structural examples of the respective functions provided in the image input system of this fifth embodiment.

In this drawing, reference numeral 1421 shows a universal (general-purpose) interface conversion module used to provide an image reading device controlling interface. This image reading device controlling interface may be used by the normal application program.

Reference numeral 1422 indicates a user interface control function for controlling display/input of a user interface. The user sets a desirable reading parameter to a image input device by using this user interface.

Reference numeral 1423 represents a network client function for transferring requests issued form these clients to a server side.

Also, reference numeral 1424 denotes a network server function module for receiving the request sent from the client function to call the corresponding function of the module provided on the server side.

Both the module 1423 and the module 1424 transmit/receive data via a network in the case that a client module is separately provided with a server module on the network, whereas these modules 1423 and 1424 directly transmit/receive data in the case that both the client module and the server module are provided on the same local machine.

These two modules are employed so as to realize the above-explained data exchange. A function (mathematical function) provided by a module on the server side is transparently called on the client side. That is, the module on the server side is to provide a function similar to such a function which is directly and locally used.

Also, reference numeral 1425 shows an image input device control module for providing a function (mathematical function) for responding to a request on the client side via the network server module 1424.

Reference numeral 1426 represents an image input device which is locally connected to a device where this server module is present.

Figure 14:
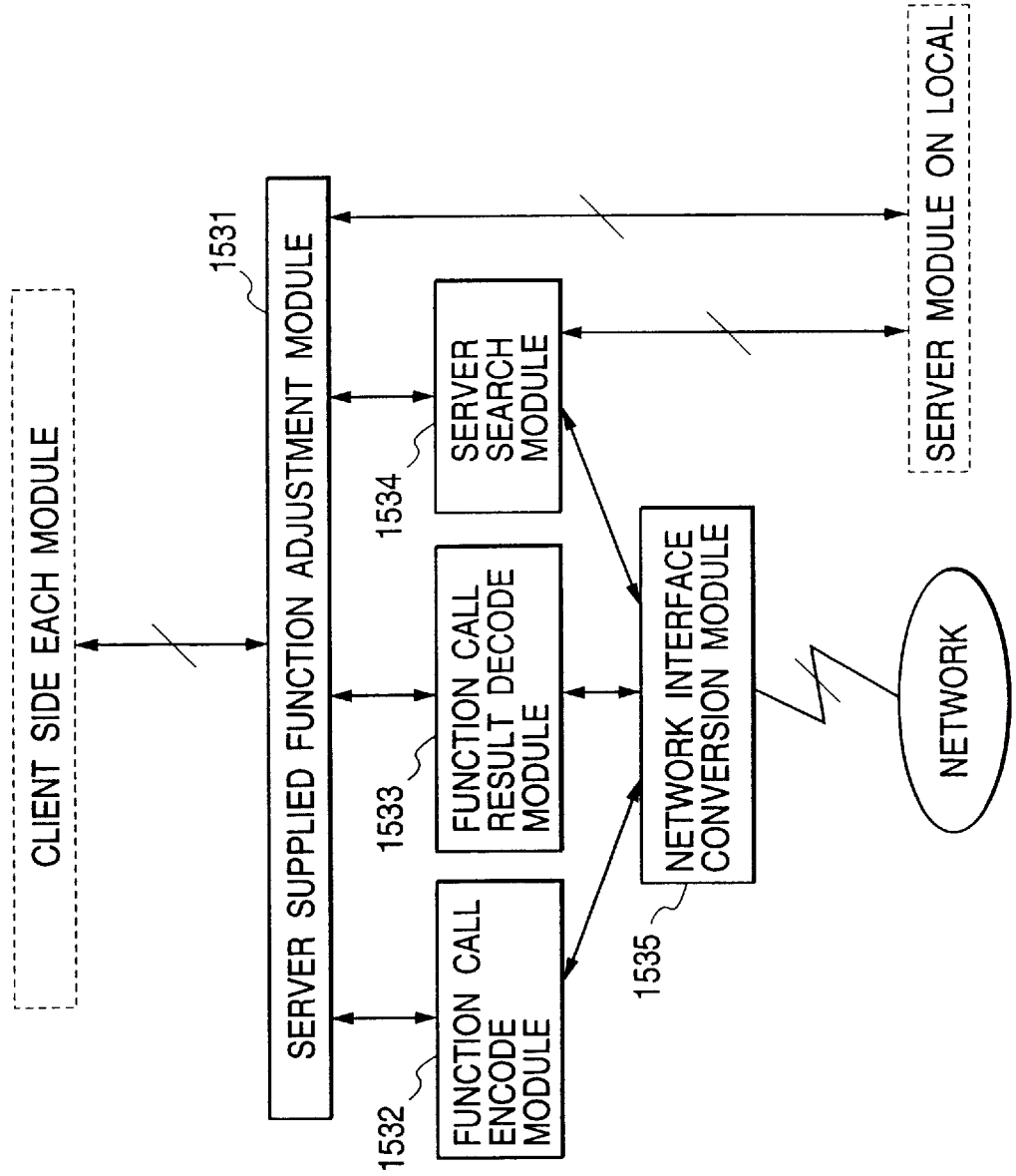
FIG. 14 is a diagram for representing structural examples of the respective functions of the network client function module 1423, according to the fifth embodiment.

FIG. 14 represents structural examples of the respective functions realized in the network client function module 1423 according to this fifth embodiment of the present invention.

In this drawing, a server supplied function adjustment module 1531 is to call a function (mathematical function) provided on the server side, and may convert interfaces of individually specific mathematical functions into universal interfaces. The respective modules provided on the client side necessarily access through this mathematical function when the mathematical function provided on the server side is used.

For example, in the case that the following mathematical function is provided on the server side:

Fx (x1, x2, x3), this server supplied function adjustment module 1531 uses this module to convert the above-explained mathematical function into the below-mentioned universal mathematical function in order to call the first-mentioned mathematical function on the client side:

Sx (Fx, n, Pptr[], Aptr[]).

In this universal mathematical function,
symbol Sx: function name of universal mathematical function,
symbol Fx: head pointer of character stream of function name provided on the server side,
symbol Pptr[]: head pointer of array set of parameters used in mathematical function Fx, and
symbol Aptr[]: attribute information of parameters set in above array set.

Since such a universal conversion is carried out, the function may be called from the client side under a preselected rule without any adverse influence caused by differences in the interfaces of the mathematical functions provided from the server side.

Furthermore, when the above-explained mathematical functions are used on the network, there are some possibilities that the respective parameters of these mathematical functions must be converted. For instance, in such a processing case that while a memory region is secured on the client side, a head address of this memory region is transferred as a parameter and also a value is set to this parameter on the server side, if the server module and the client module are present on separately provided devices which are connected to each other via the network, then the following process operation is carried out. That is, a memory region having the same size of the above-explained memory region is again secured on the server side, and then the module on the server side writes the processing result into this secured memory region.

A function call encode module 1532 converts a parameter as an initial process stage of the above-explained process operation on the client side. On the server module side, the data obtained in this process operation is received via the network, and then this received data is converted into such a data format which is usable by the server module by way of the function call decode module.

Conversely, a function call decode result module 1533 owns a function for converting the parameter converted on the server side into such data usable on the client side.

A server search module 1534 is employed to check as to whether or not a server module requested by this client module is present in a local machine, otherwise to check as to where this request server module is located on the network in the case that this serve search module 1534 judges that the requested server module is not present in the local machine.

When this server search module 1534 judges that the server module is located on the network, this module 1534 transmits/receives data by using the above-explained modules 1532, 1533, 1535. Conversely, when this server search module 1534 judges that the server module is located in the local machine, this module directly transmits/receives data with the server module.

A network interface conversion module 1535 is employed to convert the data produced by this client module into such data having a communicatable data format.

Figure 15:
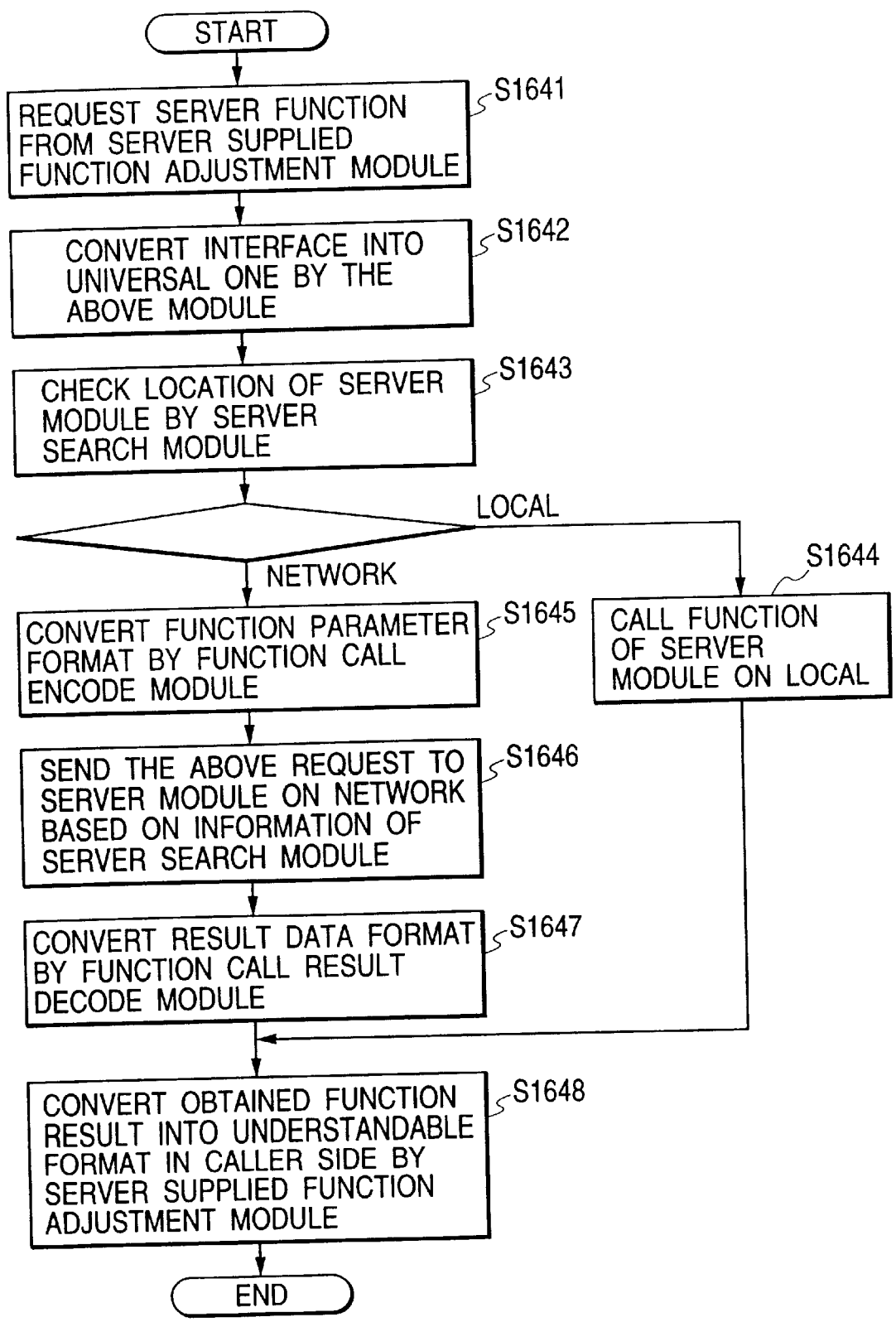
FIG. 15 is a flow chart for explaining an example of process flow operation executed in such a case that a function request is issued from each of client modules to a server module in the network client module 1423 according to the fifth embodiment.

FIG. 15 is a flow chart for describing a process flow operation in the case that each module of a client issues a request of a function to a server module in the network client module 1423.

At a step S1641, a request for the server function supplied mathematical function of each module on the client side is accepted by the service supplied function adjustment module.

At a step S1642, the accepted server supplied mathematical function is converted into a universal interface function by this server supplied function adjustment module.

At a step S1643, a location of a server module is searched by the server search module. When this server search module judges that the server module is present at a local machine, this process operation is branched to a process operation defined at a step S1644, whereas when this server search module judges that the server module is present on the network, the process operation is branched to a further step S1645.

Since the server module is present in the local machine at a step S1644, the mathematical function is directly called to this server module.

Since the server module is present on the network at a step S1645, the parameter format of the mathematical function is changed by the function call encode module so as to be prepared for use on the server side.

At a step S1646, the data converted at the previous step S1645 in accordance with the information of the server search module is sent to the server module on the network.

At a step S1647, a result obtained by processing the requested function of the client side on the server side is received, and then this received result is converted into such a data format usable on the client side by the function call result decode module.

At a step S1648, the result of the mathematical function obtained by the server supplied function module is converted, from the one having a general format, into a format which can be interpreted on the client side. Then, the process operation is accomplished.

Figure 16:
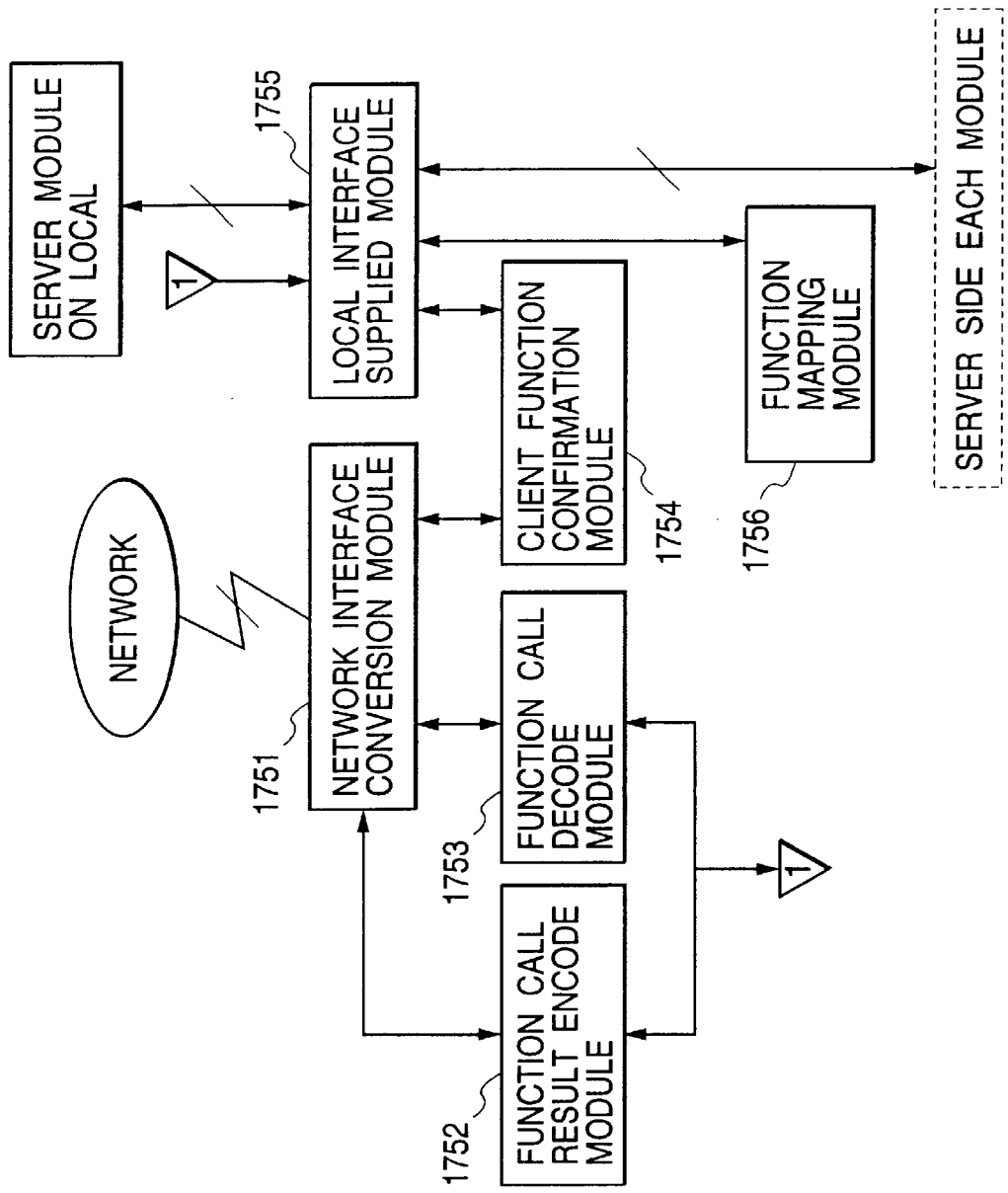
FIG. 16 schematically represents structural examples of the respective functions of the network server function module 1424 according to the fifth embodiment.

FIG. 16 represents structural examples of the respective functions of the network server function module 1424 according to this fifth embodiment of the present invention.

In this drawing, a network interface conversion module 1751 is a module for converting data processed in this module into a data format which can be transmitted/received via the network to/from the client side.

A function call result encode module 1752 executes a converting process of a call result of a mathematical function processed on the server side, by which this encoded call result can be used on the client side, as an initial stage.

A function call decode module 1753 decodes a parameter which is encoded so as to call a server function on the client side into a parameter format which can be used on the server side. The decoded result is transferred to a local interface supplied module 1755 so as to be processed under local environment.

A client function confirmation module 1754 is such a module operable as follows. When this server module is accessed from the client module via either the network or the local call, this client function confirmation module 1754 subsequently specifies a position on the network of the client module, and determines a data exchange method, namely whether the subsequent process operation is carried out via the network, or via the local call.

A local interface supplied module 1755 converts a universal function provided from the client side into a function interface format usable on the server side, and also requires a process operation of a proper function in accordance with a function mapping table 56.

Conversely, this local interface supplied module 1755 executes the following process operation. That is, the processed result of the server module is returned to the client side (in case of local connection), or the function call result is transferred to the encode module.

FIG. 18 is a flow chart for describing a process flow operation in the case that each module of a client issues a request of a function to a server module in the network client module 1424.

At a first step S1861, a location of a client module to which an access request was issued is searched by the client information confirmation module. When this client information confirmation module judges that the server module is present at a local machine, this process operation is branched to a process operation defined at a step S1863, whereas when this client information confirmation module judges that the server module is present on the network, the process operation is branched to a further step S1862.

At a step 1862, a request issued from the client via the network is converted into a parameter format usable on the server side by a function call decode module 1853, and then the process operation is branched to a step S1863.

At a step S1863, the function request issued from the client side is converted into a such a function format which can be interpreted on the server side by the local interface supplied module.

At steps S1864 and S1865, this function on the server side is called in accordance with the function mapping table 1756.

At a step S1866, the processed result of the function is again returned, and the process operation is branched by the location of the call source client module.

When the client module is present on the network, the process operation is branched to a step S1867, whereas when the client module is present on the local machine, the process operation is branched to a step S1868.

At a step S1867, the processed result of the function is returned via the local interface supplied module to the client module of the local machine.

At a step S1868, the processed result of the function is processed as an initial process by the function call result encode module 1752 so as to be transferred to the client side.

At a step S1869, the processed result on the server side is converted into a data format which can be transferred via the network by the network interface conversion module, and the converted data format is transmitted to the client module.

In the above-explained embodiment, description was made of the image reading device such as the scanner is connected to each of the terminal apparatus on the network, so that the common system of this image reading device is constituted. The device to be commonly used is not limited only to this image reading device, but may be realized by employing, for example, an interface unit, a printer, a copying machine, and a facsimile machine.

Also, the public network such as a telephone line may be employed instead of the network.

Further, the functions of the above-explained embodiments are realized by the control program stored in the PMEM 3 of FIG. 1, the hard disk, or the floppy disk (not shown). In this case, this control program itself, or a means for supply this control program to a computer (CPU or MPU) employed in a machine are covered by the technical scope of the present invention.

As this means for supplying the control program to the computer, for example, as a storage medium for storing this control program, there are provided an optical disk, an opt-magnetic disk, a CD-ROM, a magnetic tape, and a non-volatile memory card may be employed in addition to the above-explained floppy disk and hard disk.

Not only the functions of the above-described embodiment modes may be realized by executing the supplied program by the computer, but also the functions of these embodiment modes may be realized by such an OS (operating system) operated on this computer program, or by executing the supplied program in conjunction with another application software, which may be covered by the technical scope of the present invention.

Furthermore, after the supplied program has been stored into a computer function extended board, or a memory employed in a function extended unit connected to the computer, a CPU provided in this function extended board or function extended unit executes a portion of the actual process operation, or the entire portion thereof in response to an instruction of this program, and thus, the functions of the above-described embodiments may be realized by this process operation, which may be similarly encompassed by the technical scope of the present invention.

In accordance with the above-described embodiment, when the commonly-usable image reading device is connected to the terminal apparatus on the network, the server function of the common system is automatically installed, so that the devices which are not effectively used can be readily commonly used. the workload for setting the common system by the user can be markedly reduced. When the installation of the server function is not required, such a server function installation is not carried out. As a result, a waste of resource of the terminal apparatus can be avoided.

Also, since the notification means for notifying such a fact that the device is commonly used is provided with the terminal apparatus on the network, a large number of users who use the terminal apparatus on the network can effectively utilize the common system.

Also, since the module for determining whether or not the server function of the common system is present is installed from the installer into the device on the network, the user can use the image reading device without paying his attention to the installation process.

Further, since the network manager designates such a terminal apparatus to which the server function of the common system can be installed, and the user of the terminal apparatus allows to install the server function, the common system can be constituted/set by considering security of the respective terminals. Therefore, the optimum common system can be constructed/set.

In addition, the user of the terminal apparatus can utilize the image reading device without paying his attention to the connection mode of this image reading device even when the image reading device is locally connected to the own terminal, or is connected via the network to the own terminal.

What is claimed is:

1. An information processing apparatus connected to a network, comprising:

saving means for saving therein a server program by which a peripheral device locally connected to another device provided on said network is commonly used on said network;

acquiring means for acquiring a notification sent from said another device;

judging means for judging as to whether or not said server program is required to be installed into said another device based upon the content of said notification acquired by said acquiring means;

installing means for installing said server program into said another device based upon the judgement result of said judging means;

registering means for previously registering a device provided on said network, which is allowed to install therein said server program; wherein:

when said another device is not allowed to install therein the server program by said registering means, said installing means does not install said server program irrespective of the judgement result of said judging means.

2. An information processing apparatus according to claim 1 wherein:

when the installation of said server program to said another device is accomplished, such a notification that the peripheral device connected to said another device can be commonly used on the network is sent to a terminal apparatus provided on said network.

3. An information processing apparatus according to claim 1 wherein:

said peripheral device is an image input device.

4. A system in which at least a first information processing apparatus and a second information processing apparatus are connected via a network to each other, wherein:

said first information processing apparatus is comprised of:

connecting means for locally connecting thereto a peripheral device;

detecting means for detecting as to whether or not the peripheral device is connected to said connecting means; and judging means for judging as to whether or not a request for installing a server program by which said peripheral device is commonly used on the network is issued to said second information processing apparatus based upon the detection result of said detecting means;

when said detecting means detects that said peripheral device is connected, said judging means outputs such a judgement result that said server program installation request is issued, whereas when said detecting means detects that said peripheral device is not connected, said judging means outputs such a judgement result that said server program installation request is not issued; and wherein:

said second information processing apparatus is comprised of:

installing means for installing said server program to a device provided on said network;

in response to the server program installation request issued from said first information processing apparatus, said installing means installs said server program into said first information processing apparatus; and registering means for previously registering a device provided on said network, which is allowed to install therein said server program; wherein:

when said first information processing apparatus is not allowed to install therein the server program by said registering means in said second information processing apparatus, said installing means does not install said server program irrespective of the installation request issued from said first information processing apparatus.

5. An information processing apparatus according to claim 4, wherein said first information processing apparatus is further comprised of:

second judging means for judging as to whether or not said server program is already installed; and wherein:
in the case that said second judging means judges that said server program is already installed in said first information processing apparatus, said install request of the server program is not issued irrespective of the detection result of said detecting means.

6. An information processing apparatus according to claim 4 wherein:

when the installation of said server program is accomplished in said first information processing apparatus, such a notification that the peripheral device connected to said connecting means can be commonly used on the network is sent to another device provided on said network.

7. An information processing apparatus according to claim 4 wherein said first information processing apparatus is further comprised of:

setting means for setting as to whether or not said server program is installed by a user; and
wherein:
when said setting means sets that said server program is not installed in said first information processing apparatus, the request for installing the server program is not issued irrespective of the detection result of said detecting means.

8. An information processing apparatus according to claim 4 wherein:

when the installation of said server program to said first information processing apparatus is accomplished by said installing means, such a notification that the peripheral device connected to said first information processing apparatus can be commonly used on the network is sent to a terminal apparatus provided on said network.

9. An information processing apparatus according to claim 4 wherein:

said peripheral device is an image input device.

10. An information processing apparatus according to claim 5 wherein:

said second information processing apparatus judges as to whether or not a program used to execute said detecting means, said judging means, and said second judging means is installed into said first information processing apparatus; and
when said second information processing apparatus judges that said program is not installed, said program used to execute said detecting means, said judging means, and said second judging means is installed into said first information processing apparatus.

11. A method for commonly using a peripheral device locally connected to an information processing apparatus connected to a network, comprising the steps of:

acquiring a notification sent from another device provided on said network;
judging as to whether or not said server program for commonly using the peripheral device locally connected to said another device on said network is required to be installed into said another device based upon the content of said acquired notification;
installing said server program into said another device based upon the judgement result; and
previously registering a device provided on said network which is allowed to install therein said server program; wherein:
when said another device is not allowed to install therein the server program, said installing step does not install said server program irrespective of the judgement result of said judging step.

12. A method according to claim 11 wherein:

when the installation of said server program to said another device is accomplished, such a notification that the peripheral device connected to said another device can be commonly used on the network is sent to a terminal apparatus provided on said network.

13. A method according to claim 11 wherein:

said peripheral device is an image input device.

14. In a system in which at least a first information processing apparatus and a second information processing apparatus are connected via a network to each other, a method for commonly using a peripheral device locally connected to said first information processing apparatus on said network, wherein:

said first information processing apparatus: detects as to whether or not said peripheral device is locally connected;
issues a request for installing a server program by which said peripheral device is commonly used on the network to said second information processing apparatus in such a case that said detecting step detects that the peripheral device is locally connected;
receives said server program via said network in response to said installation request to thereby install the received server program into a memory of the own device; and
does not issue said server program installation request when said detecting step detects that the peripheral device is not locally connected; and wherein:
said second information processing apparatus:
installs said server program into said first information processing device in response to the installation request issued from said first information processing apparatus; and wherein:
said second information processing apparatus is comprised of:
registering means for previously registering a device provided on said network, which is allowed to install therein said server program; and wherein:
when said first information processing apparatus is not allowed to install therein the server program by said registering means in said second information processing apparatus, said installing means does not install said server program irrespective of the installation request issued from said first information processing apparatus.

15. A method according to claim 14, wherein;

said first information processing apparatus is further comprised of the step of:
judging as to whether or not said server program is already installed; and wherein:
in the case that said judging step judges that said server program is already installed in said first processing apparatus, said install request of the server program is not issued irrespective of the connection of said peripheral device.

16. A method according to claim 14 wherein:

when the installation of said server program is accomplished in said first information processing apparatus, such a notification that the locally connected peripheral device can be commonly used on the network is sent to another device provided on said network.

17. A method according to claim 14 wherein:

said first information processing apparatus is further comprised of the step of:
  setting as to whether or not said server program is installed by a user; and wherein:
    when said setting step sets that said server program is not installed in said first information processing apparatus, the request for installing the server program is not issued irrespective of the connection of said peripheral device.

18. A method according to claim 14 wherein:

when the installation of said server program to said first information processing apparatus is accomplished by said installing means, such a notification that the peripheral device connected to said first information processing apparatus can be commonly used on the network is sent to a terminal apparatus provided on said network.

19. A method according to claim 14 wherein:

said peripheral device is an image input device.

20. A storage medium for storing thereinto a computer program executed by a computer employed in an information processing apparatus connected to a network, wherein:

said computer program is comprised of:
  a process operation for acquiring a notification sent from another device provided on said network;
  a process operation for judging as to whether or not said server program is required to be installed into said another device based upon the content of said acquired notification; and
  a process operation for installing said server program into said another device based upon the judgement result; and
  a process operation for previously registering a device provided on said network, which is allowed to install therein said server program; wherein:
    when said another device is not allowed to install therein the server program by said registering means, said installing process does not install said server program irrespective of the judgement result of said judging process.

21. A computer program storage medium according to claim 20 wherein:

when the installation of said server program to said another device is accomplished, such a notification that the peripheral device connected to said another device can be commonly used on the network is sent to a terminal apparatus provided on said network.

22. A computer program storage medium according to claim 20 wherein:

said peripheral device is an image input device.

23. A computer program storage medium according to claim 20 wherein:

when the installation of said server program to said another device is accomplished, such a notification that the peripheral device connected to said another device can be commonly used on the network is sent to a terminal apparatus provided on said network.

24. A computer program storage medium according to claim 20 wherein:

said peripheral device is an image input device.

* * * * *